United States Patent
Gao et al.

(10) Patent No.: US 10,502,020 B2
(45) Date of Patent: Dec. 10, 2019

(54) SYSTEM AND METHOD FOR THE DETECTION AND TRANSMISSION OF DOWNHOLE FLUID STATUS

(71) Applicant: Halliburton Energy Services, Inc., Houston, TX (US)

(72) Inventors: Li Gao, Katy, TX (US); Walmy Cuello Jimenez, Houston, TX (US); John P. Singh, Kingwood, TX (US); Kris Ravi, Kingwood, TX (US); Thanh T. Tran, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/061,584

(22) PCT Filed: Mar. 9, 2016

(86) PCT No.: PCT/US2016/021591
§ 371 (c)(1),
(2) Date: Jun. 12, 2018

(87) PCT Pub. No.: WO2017/155529
PCT Pub. Date: Sep. 14, 2017

(65) Prior Publication Data
US 2018/0363413 A1 Dec. 20, 2018

(51) Int. Cl.
| | |
|---|---|
| *E21B 33/14* | (2006.01) |
| *E21B 34/06* | (2006.01) |
| *C09K 8/46* | (2006.01) |
| *E21B 47/12* | (2012.01) |
| *C04B 28/02* | (2006.01) |

(52) U.S. Cl.
CPC .............. *E21B 33/14* (2013.01); *C09K 8/46* (2013.01); *E21B 34/06* (2013.01); *E21B 47/12* (2013.01); *C04B 28/02* (2013.01)

(58) Field of Classification Search
CPC .......... E21B 33/14; E21B 34/06; E21B 47/12; C09K 8/46; C04B 28/02
See application file for complete search history.

(56) References Cited

U.S. PATENT DOCUMENTS

| | | |
|---|---|---|
| 2003/0029611 A1 | 2/2003 | Owens |
| 2003/0070806 A1* | 4/2003 | Connell ................. E21B 21/10 166/255.1 |
| 2003/0192695 A1 | 10/2003 | Dillenneck et al. |
| 2009/0260816 A1 | 10/2009 | Webb et al. |

(Continued)

FOREIGN PATENT DOCUMENTS

WO 2007134255 A2 11/2007

*Primary Examiner* — Silvana C Runyan
(74) *Attorney, Agent, or Firm* — McAfee & Taft (57) ABSTRACT

Systems and methods for signaling the detection of a fluid change in a wellbore can be used during wellbore operations, such as cementing a casing in the wellbore. The systems and methods involve using burst discs to provide a pressure pulse that can be detected uphole and there by provide a signal related to when a fluid change has reached a predetermined position in the wellbore. The burst discs can be activated to prevent fluid flow in a portion of the wellbore by a sensor that detects a property that is different between two fluids. Once activated, the pressure of the fluid on the burst discs subsequently ruptures the burst disc and creates the pressure pulse.

19 Claims, 4 Drawing Sheets

(56) References Cited

U.S. PATENT DOCUMENTS

| | | | |
|---|---|---|---|
| 2011/0094742 A1 | 4/2011 | Badalamenti et al. | |
| 2013/0105159 A1* | 5/2013 | Alvarez | E21B 33/12 166/290 |
| 2014/0151065 A1* | 6/2014 | Stephenson | E21B 34/063 166/374 |

* cited by examiner

US 10,502,020 B2

SYSTEM AND METHOD FOR THE DETECTION AND TRANSMISSION OF DOWNHOLE FLUID STATUS

FIELD

The present disclosure relates generally to systems and methods utilized in operations performed in conjunction with subterranean wells and, in some embodiments described herein, more particularly to systems and methods for the detection and transmission of downhole fluid status.

BACKGROUND

Without limiting the scope of the present invention, its background will be described with reference to cementing a string of casing within a wellbore as an example.

In primary cementing operations carried out in oil and gas wells, a hydraulic cement composition is disposed between the walls of the wellbore and the exterior of a pipe string, such as a casing string, positioned within the wellbore. The cement composition sets in the annulus thereby forming an annular sheath of hardened impermeable cement therein. The cement sheath physically supports and positions the pipe in the wellbore and bonds the pipe to the walls of the wellbore, thus preventing the undesirable migration of fluids between zones or formations penetrated by the wellbore.

One method of primary cementing involves pumping the cement composition down through the casing and then up through the annulus. This method requires calculating the volume of cement required to fill the annulus. Once the calculated volume of cement has been pumped into the casing, a cement plug is placed in the casing. A drilling mud is then pumped behind the cement plug such that the cement is forced into and up the annulus from the far end of the casing string to the surface or other desired depth. When the cement plug reaches a float shoe disposed proximate the far end of the casing, the cement should have filled the entire volume of the annulus. At this point, the cement is allowed to dry in the annulus into a hard, impermeable mass.

Due to the high pressure at which the cement must be pumped, at a pressure above the hydrostatic pressure of the cement column in the annulus plus the friction pressure of the system, fluid from the cement composition may leak off into a low-pressure zone traversed by the wellbore. When such leak off occurs, the remainder of the cement composition near this low-pressure stops movement and quickly sets at that location in the annulus. Once this occurs, additional cement cannot be pumped past this location and all the cement in the system sets. Thereafter, remedial cementing operations, commonly referred to as squeeze cementing, must be used to place cement in the remainder of the annulus. In addition, a large mass of cement, which was intended to be placed in the annulus, must now be drilled out of the casing.

Accordingly, prior art attempts have tried to avoid the problems associated with fluid leak off into low-pressure zones during cementing operations. In one method of avoiding such problems, called reverse cementing, the cement composition is pumped directly into the annulus. Using this approach, the pressure required to pump the cement to the far end of the annulus is much lower than that required in conventional cementing operations. Thus, the likelihood of flash freezing the cement in the annulus before the entire annulus is filled with cement is significantly reduced.

With reverse cementing, it is necessary to identify when the cement begins to enter the far end of the casing such that the cement pumps may be shut off. Continuing to pump cement into the annulus after cement has reached the far end forces cement into the casing, which in turn may necessitate a drill out operation.

One method of identifying when the cement has reached the far end of the annulus involves running a neutron density tool down the casing on an electric line. The neutron density tool monitors the density out to a predetermined depth into the formation. When the cement begins to replace the drilling mud in the annulus adjacent to the neutron density tool, the neutron density tool senses the change in density and reports to the surface that it is time to stop pumping additional cement into the annulus. Another method of identifying when the cement has reached the far end of the annulus involves running a resistivity tool and a wireless telemetry system down the casing on a wireline. The resistivity tool monitors the resistivity of the fluid in the casing such that when the cement begins to replace the drilling mud in the casing, a wireless signal sent to the surface indicates it is time to stop pumping additional cement into the annulus.

Use of such retrievable tool systems can be prohibitively expensive. Neutron density tools and resistivity tools can also be ruined during such operations as a result of the cement entering the far end of the casing and contacting these tools.

Therefore, a need has arisen for a system and method for cementing the annulus between the wellbore and the casing that does not require pumping the cement at pressures that allow for leak off into low-pressure zones. More generally, a need has also arisen for a system and method that identify when to stop pumping fluids, including but not limited to cement, into the wellbore. Further, a need has arisen for such a system and method that do not require the use of expensive equipment including tools that must be retrieved from the well once the introduction of fluids is complete.

DETAILED DESCRIPTION

In the description that follows, like parts are marked throughout the specification and drawings with the same reference numerals, respectively. The drawings are not necessarily to scale and the proportions of certain parts have been exaggerated to better illustrate details and features of the invention. In the following description, the terms "upper," "upward," "uphole," "lower," "below," "downhole" and the like as used herein shall mean in relation to the bottom or furthest extent of the surrounding wellbore even though the wellbore or portions of it may be deviated or horizontal. The terms "inwardly" and "outwardly" are directions toward and away from, respectively, the geometric axis of a referenced object. Where components of relatively well-known design are employed, their structure and operation will not be described in detail.

With reference to the drawings, embodiments will be described in relation to a reverse cementing operation; however, the methods and systems described herein can be applicable to other downhole operations. In particular, the methods and systems can be useful where two fluids are used sequentially in a wellbore and there is a need to communicate a binary "yes or no" signal from downhole to the surface, such as determining when the second of the two fluids has reached a certain destination in the wellbore or casing. Generally, having a sophisticated communication infrastructure for such a purpose is not cost effective, at the very least, and often, a huge overkill for the need. Thus, the current disclosure relates to optimum detection of fluids of interest in the downhole environment accompanied by the generation of a positive or negative pulse communicated through the fluid to the surface or the seabed where a receiver is located, depending on the well's configuration. Generally, the receiver will be located at the pipe's uphole end; hence, at the surface or seabed, depending on whether the well is land based or off shore, and depending on the use of a riser. As used herein, "pipe's uphole end" refers to the upper end of the casing or the upper end of the riser. In wells where a riserless configuration is used, the receiver can be located at the seabed and then the signal transmitted to the surface through underwater communication mechanisms, such as a wireless acoustic modem communication to the surface, an electromagnetic transmission, etc.

Once the presence of the second of the two fluids is detected by either chemical or physical sensing, a mechanical response is triggered and communicated to the pipe's uphole end through an acoustic wave in the pipe (the casing and/or riser). At the uphole end, the receiver, which may be a pressure sensor for fluid pulse or an accelerometer for an acoustic wave in pipe, is used to detect the event. The detected signal, then, serves as a confirmation that the second of the two fluids has reached the desired destination. Accordingly, the present system can effectively detect when a desired fluid reaches a downhole destination. Alternatively, it can also sense when a desired condition is achieved downhole, such as when a chemical change occurs in a fluid that is already at the destination. For example, the fluid undergoes a pH change, reaches a target temperature or pressure, or changes electrical conductivity, electrical resistivity or magnetic permeability. Additional examples are a change in dielectric constant, density, viscosity or optical properties.

Figure 1:
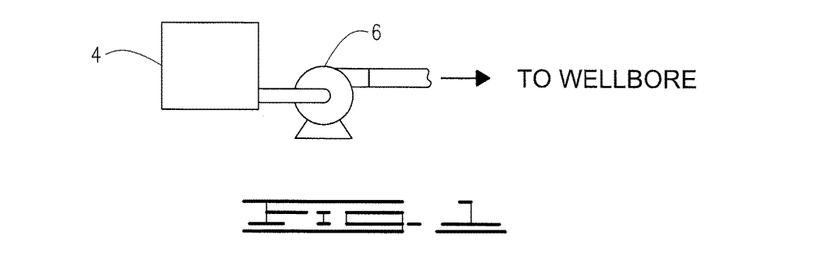
FIG. 1 illustrates a system for preparation and delivery of a cement composition to a wellbore in accordance with aspects of the present disclosure.

The present systems and methods will now be more specifically described in relation to a reverse cementing operation and with reference to the figures. FIG. 1 illustrates a system useful in the preparation of a cement composition in accordance with example embodiments. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 2:
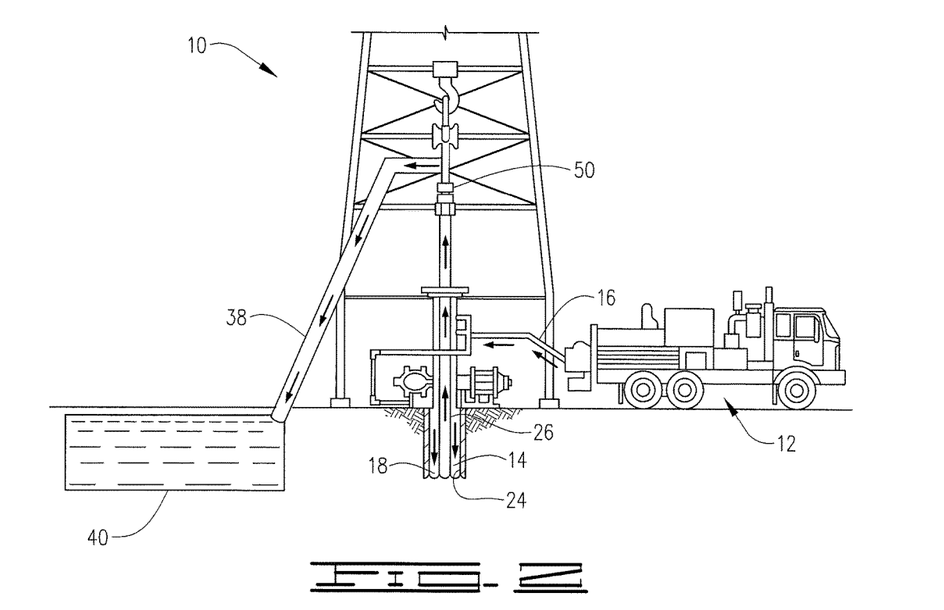
FIG. 2 illustrates surface equipment useful in the placement of a cement composition in a wellbore in accordance with aspects of the present disclosure.

An example technique and system for placing a cement composition into a subterranean formation will now be described with reference to FIG. 2. FIG. 2 illustrates surface equipment 10 that may be used in placement of a cement composition in accordance with certain embodiments. While FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and downhole into an annulus 18 between the wall 24 of a wellbore 22 and a casing 26.

Figure 3:
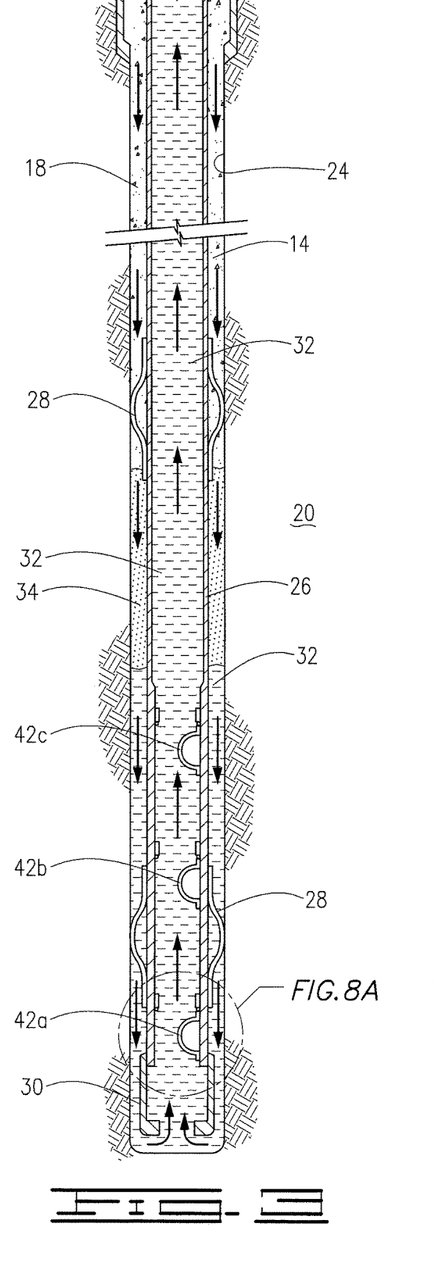
FIG. 3 illustrates placement of a cement composition into a wellbore annulus utilizing a system having three burst discs in accordance with aspects of the present disclosure.

Turning now to FIG. 3, the cement composition 14 may be placed into a subterranean formation 20 in accordance with example embodiments. As illustrated, wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises wall 24. In the illustrated embodiments, a casing 26 has been inserted into the wellbore 22. As illustrated, there is a wellbore annulus 18 formed between the casing 26 and the walls 24 of the wellbore 22. One or more centralizers 28 may be attached to the casing 26, for example, to centralize the casing 26 in the wellbore 22 prior to and during the cementing operation.

With continued reference to FIG. 3, the cement composition 14 is pumped down annulus 18. The cement composition 14 flows down annulus 18 to and/or through casing shoe 30 at the bottom of the casing 26. Cement composition flowing through casing shoe 30 will flow into and up casing 26. The cement composition 14 may be allowed to set in the wellbore annulus 18, for example, to form a cement sheath that supports and positions the casing 26 in the wellbore 22. However, after cement composition 14 sets, that portion in casing 26 will need to be drilled out. Accordingly, limiting the amount of cement composition entering into casing 26 is desirable.

As it is introduced, the cement composition 14 may displace other fluids, such as drilling fluids 32 and/or spacer fluids 34, which may be present in annulus 18 and/or casing 26. At least a portion of the displaced fluids may exit casing 26 via a flow line 38 and be deposited, for example, in one or more retention pits 40 (e.g., a mud pit), as shown on FIG. 2.

Referring to FIGS. 3, 8A, 8B and 8C, casing 26 has one or more burst discs 42 spaced along its downhole end. As illustrated, casing 26 has three burst discs 42a, 42b, 42c. Each burst disc 42 has an actuator (shown as actuator 44a in FIG. 8) for activating burst disc 42 between a first or open position and a second or closed position. Coupled to actuator 44 is a sensor (shown as sensor 46a in FIG. 8), used to detect a change in the property of the fluid surrounding the sensor and send a signal to the actuator when it is time to activate burst disc 42. As shown in the figures, only actuator 44a and sensor 46a are labeled.

Wellbore 22 and casing 26 can be filled with various fluids. As illustrated, the fluids include drilling fluid 32, spacer fluid 34 and cement composition 14. Drilling fluid 32 may be any typical drilling fluid such as a water-based or oil-based drilling fluid. Importantly, drilling fluid 32 is used to contain subsurface pressure. Accordingly, drilling fluid 32 is weighted with various additives so that the hydrostatic pressure of drilling fluid 32 is sufficient to contain subsurface pressure along the entire depth of wellbore 18, thereby preventing blowouts.

Cement composition 14 may be any typical hydraulic cementitious material including those comprising calcium, aluminum, silicone, oxygen and/or sulfur which set and harden by reaction with water. Such hydraulic materials include Portland cements, pozzolana cements, gypsum cements, high aluminum content cements, silica cements and high alkalinity cements. Portland cements are generally preferred for use in accordance with the present invention. Preferred Portland cements include classes A, B, C, G and H.

The water used in forming cement composition 14 can be from any source provided it does not contain an excess of compounds that adversely affect other components in cement composition 14. Generally, water is present in a cement slurry composition in an amount in the range of from about 25% to about 100% by weight of hydraulic material therein and, more preferably, in an amount in the range of from about 30% to about 75% by weight of hydraulic material therein. In addition, various dispersing agents can also be utilized in cement composition 14. The dispersing agent functions to facilitate the dispersal of the solids in the water, and allows the use of smaller amounts of water than is the case without the dispersing agent.

Spacer fluid 34 may be any suitable viscous fluid that is capable of maintaining substantial separation between drilling fluid 32 and cement composition 14. In some embodiments, as described below, spacer fluid can have a detectable property that is different from either cement composition 14 or drilling fluid 32. Detectable properties can include pH, temperature, electrical conductivity, electrical resistivity, dielectric constant, magnetic permeability, radioactivity, density, viscosity, optical properties or a chemical reaction. Additionally, the detectable property can be a tracer based trigger, such as a RFID (radio frequency identification tag). In some cases, the chemical reaction can be caused by a compound in the fluid reacting with a chemical sample contained by the sensor.

The sensors will detect a change in a property of the fluid surrounding the sensor. Accordingly, the surrounding fluid must undergo a chemical or physical change or be displaced by a fluid having a differing detectable property. As examples, the surrounding fluid can undergo a chemical change to have a different pH or that causes a temperature change in the fluid, or can undergo a physical change by absorbing heat from the surrounding subterranean formation. More typically, the surrounding fluid will be displaced by a fluid having a different detectable property. In the current embodiment, spacer fluid 34 displaces drilling fluid 32, and they can have at least one different detectable property, such as differing pH, temperature, electrical conductivity, electrical resistivity, dialectical constant, magnetic permeability, radioactivity, density, viscosity, optical properties, or a chemical reaction. Additionally, the detectable property can be a tracer based trigger, such as a RFID (radio frequency identification tag). Also, in the current embodiment, cement composition 14 displaces spacer fluid 34; thus, alternatively, they can have at least one different detectable property. In some embodiments, a spacer fluid is not used so that the cement composition directly displaces the drilling fluid and; thus, the cement composition and drilling fluid would have at least one different detectable property. The current embodiment is described below with the spacer fluid having the different detectable property of pH from the drilling fluid; however, other detectable properties can be used in place of pH and different fluids can be used as having the detectable property.

Returning to FIG. 3, cement composition is introduced into annulus 18 and pumped downhole under a first pressure displacing spacer fluid 34 and drilling fluid 32 in the annulus. The displaced drilling fluid passes through casing shoe 30 and up casing 26 flowing uphole towards the surface.

Figure 4:
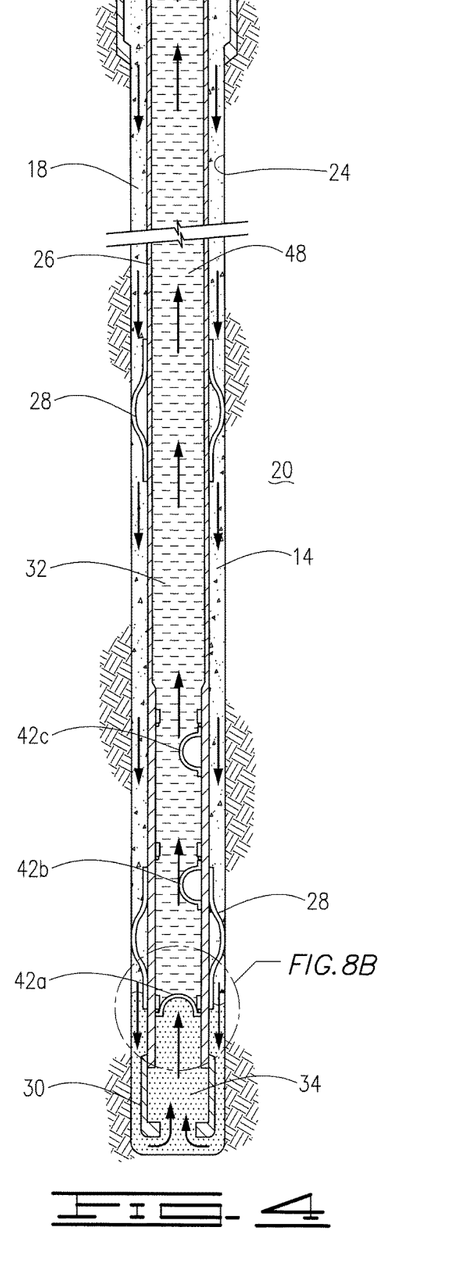
FIG. 4 illustrates the system of FIG. 3 after closure of the first burst disc.
Figure 8A:
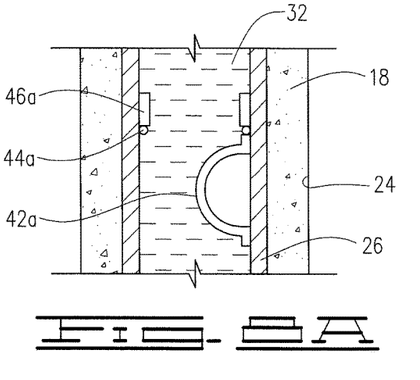
FIGS. 8A, 8B and 8C are enlargements of sections of FIGS. 3, 4 and 5, respectively.
Figure 8B:
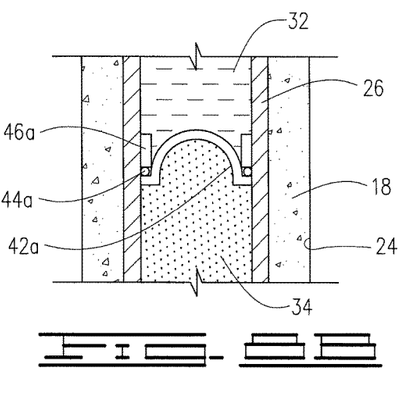
Figure 8C:
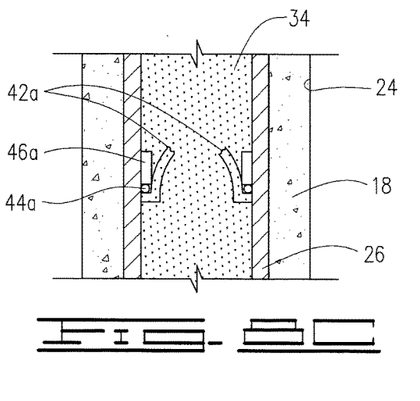

Turning now to FIGS. 4 and 8B, drilling fluid 32 has been displaced past first burst disc 42a so that spacer fluid 34 now surrounds sensor 46a. Generally, drilling fluid has a pH below 9 and, typically, of around 8. Cement compositions generally have a pH of 12 or greater. In the current embodiment, the spacer fluid has been adjusted to have a pH similar to the cement composition. As the spacer fluid passes flows upward in casing 26 to surround sensor 46a, sensor 46a detects the change in pH and sends a signal to actuator 44a, which activates burst disc 42a to move from the open position to the closed position. Alternatively, the spacer fluid can have a pH lower than the cement composition and the activation of the burst disc 42a can be when the cement composition surrounds sensor 46a.

Figure 5:
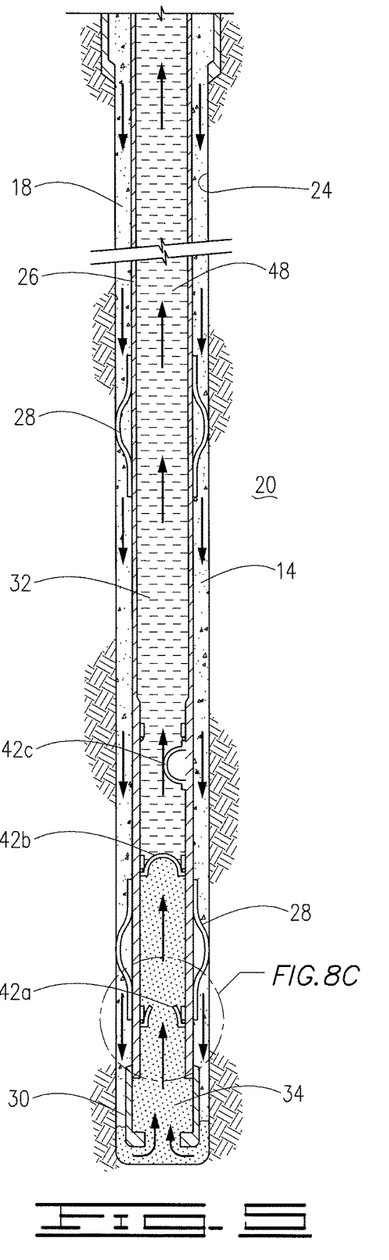
FIG. 5 illustrates the system of FIG. 3 after rupture of the first burst disc and closure of the second burst disc.

In the closed position illustrated in FIGS. 4 and 8B, burst disc 42a stops the upward flow of fluid in casing 26. The continued pumping of cement composition in the annulus causes fluid pressure to build downhole from burst disc 42a until a predetermined pressure is reached at which time burst disc 42a ruptures and fluid flow is again allowed upward through casing 26, as can be seen from FIGS. 5 and 8C. The predetermined pressure to rupture burst disc 42a will be higher than the first pressure maintained on the fluids in annulus 18 and casing shoe 30 when flow is not obstructed but will be low enough to not adversely affect the surrounding subterranean formation, such as by causing unwanted fracturing of the formation and/or displacement of fluids into the subterranean formation.

The rupturing of burst disc 42 and resulting release of fluids to flow upwards past burst disc 42, cause a pressure pulse, which is an acoustic wave that can be transmitted through fluid column 48 and/or through casing 26. The pressure pulse travels uphole and can be detected by receiver 50 at the pipe's uphole end (FIG. 2), as defined above. Generally, if the pressure pulse or acoustic wave is detected from the fluid column, a pressure transducer can be used as receiver 50. If the pressure pulse or acoustic wave is detected from the casing, an accelerometer generally can be used.

While in some embodiments, the receiver will only detect one pressure pulse in either the fluid column or the pipe (the casing and/or riser), in other embodiments, the receiver will detect the pressure pulse in both. Embodiments detecting the pressure pulse in both can take advantage of the difference in the speed of sound in fluid and the speed of sound in the solid casing. For example, the speed of sound in the fluid column typically will be approximately from 1200 m/s to 1400 m/s, and the speed of sound in a steel casing or risers typically will be approximately 5900 m/s. Accordingly, the receiver will first detect the pressure pulse in the casing and then in the fluid column. The time difference between these two detections can be determined and compared with an estimated time difference based on the known well depth and the known placement of the burst disc. If the actual time difference correlates with the estimated time difference, the detected pressure pulses represent a true burst disc event. It they do not correlate, then the detected pressure pulses represent noise; that is, it represents an event not related to the rupturing of a burst disc.

Figure 6:
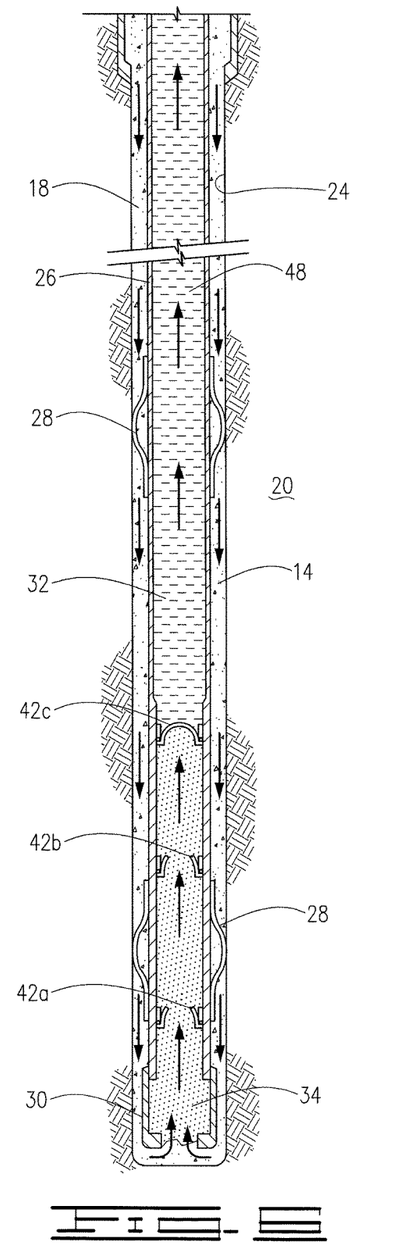
FIG. 6 illustrates the system of FIG. 3 after rupture of the second burst disc and closure of the third burst disc.

Turning again to FIGS. 5 and 8C, drilling fluid 32 is displaced from around burst disc 42b, once burst disc 42a ruptures and fluid flow up through casing 26 continues. When spacer fluid 34 reaches the sensor associated with burst disc 42b, the sensor sends a signal to the actuator associated with burst disc 42b, which activates burst disc 42b to move from the open position to the closed position. In the closed position illustrated in FIG. 5, burst disc 42b stops the upward flow of fluid in casing 26. The continued pumping of cement composition in the annulus caused fluid pressure to build downhole from burst disc 42b until a predetermined pressure is reached at which time burst disc 42b ruptures and fluid flow is again allowed upward through casing 26, as can be seen from FIG. 6. The predetermined pressure to rupture burst disc 42b can be the same or different from the predetermined pressure to rupture burst disc 42a. The predetermined pressure to rupture burst disc 42b typically will be higher than the first pressure maintained on the fluids in annulus 18 and casing shoe 30 when flow is not obstructed and will be low enough to not adversely affect the surrounding subterranean formation, such as by causing unwanted fracturing of the formation and/or displacement of fluids into the subterranean formation. The rupturing of burst disc 42b results in a pressure pulse transmitted through fluid column 48 and/or through casing 26, as described above.

Figure 7:
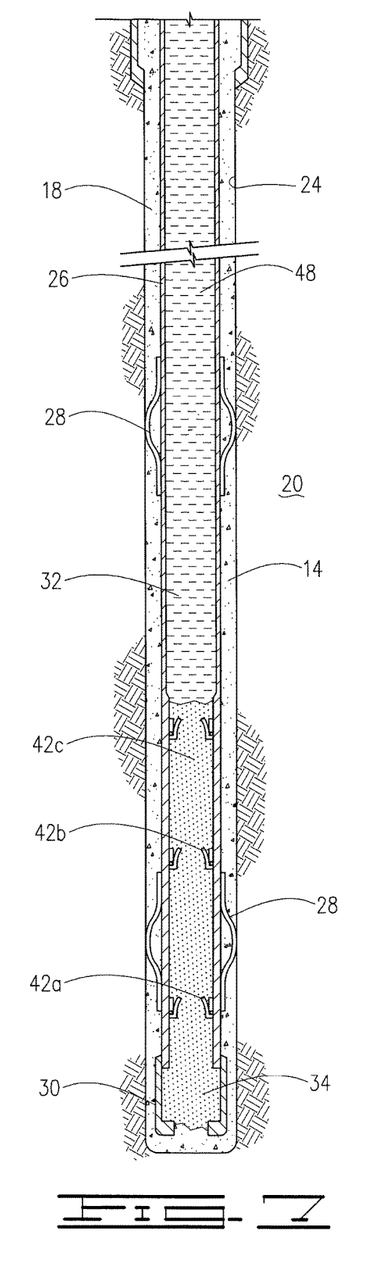
FIG. 7 illustrates the system of FIG. 3 after rupture of the third burst disc.

Turning again to FIG. 6, drilling fluid 32 is displaced from around burst disc 42c, once burst disc 42b ruptures and fluid flow up through casing 26 continues. When spacer fluid 34 reaches the sensor associated with burst disc 42c, the sensor sends a signal to the actuator associated with burst disc 42c, which activates burst disc 42c to move from the open position to the closed position. In the closed position illustrated in FIG. 6, burst disc 42c stops the upward flow of fluid in casing 26. The continued pumping of cement composition in the annulus caused fluid pressure to build downhole from burst disc 42c until a predetermined pressure is reached at which time burst disc 42c ruptures and fluid flow is again allowed upward through casing 26, as can be seen from FIG. 7. The predetermined pressure to rupture burst disc 42c can be the same or different from the predetermined pressures to rupture burst discs 42a, 42c. The predetermined pressure to rupture burst disc 42c typically will be higher than the first pressure maintained on the fluids in annulus 18 and casing shoe 30 when flow is not obstructed and will be low enough to not adversely affect the surrounding subterranean formation, such as by causing unwanted fracturing of the formation and/or displacement of fluids into the subterranean formation. The rupturing of burst disc 42c results in a pressure pulse transmitted through fluid column 48 and/or through casing 26, as described above.

Once burst disc 42c ruptures, fluid flow up through casing 26 can continue. Typically, the resulting series of three pressure pulses is detected uphole at receiver 50, which, as discussed above, may detected the pressure pulse as transmitted through the fluid column, the pipe or both. Upon detection of the three pressure pulses, receiver 50 sends a signal to stop the pumping equipment 6 from introducing additional cement. Alternatively, receiver 50 can send a signal to an operator that the pressure pulses have been detected. The operator can then take an appropriate action, such as stopping the pumping equipment 6. With the introduction of cement stopped, the cement in annulus 18 can be allowed to set. Naturally, the use of three burst discs and the generation of three pressure pulses are for explanation purpose. A system in accordance with this disclosure can use more or less than three burst discs, as appropriate; thus, in some cases, a single burst disc and resulting pressure pulse will be sufficient, and in other cases, four or more burst disc and resulting pressure pulses might be used.

In some embodiments where multiple burst discs are used, the associated sensors can detect the same property and use the same property level as a trigger for sending an activation signal to the associated activator. For example, in the above-described embodiment, sensors 46a, 46b, 46c can all detect pH as the property and initiate triggering of the burst disc when a pH of 12 or greater is detected.

In other embodiments where multiple burst disc are used, one or more of the associated sensors can detect different properties and/or a different level of the same property For example, if sensor 46a detects pH, sensor 46b can detect electrical conductivity. If used, sensor 46c then can detect pH, electrical conductivity or a third property, such as temperature. As another example, if sensor 46a detects whether the surrounding fluid has a pH of 10 or above, then sensor 46b can detect whether the surrounding fluid has a pH of 11 or above, and sensor 46c can detect whether the surrounding fluid has a pH of 12 or above. These techniques can also utilize the duel detection of pressure pulses in casing and the fluid column to determine which burst disc has ruptured. In this manner, the simple binary communication of the burst discs can be used to communicate more complex information related to the fluids in the casing.

In still other embodiments using multiple burst discs, the burst disc can each have a different rupturing pressure. A specific sequence of rupturing pressures can be predetermined into the series of discs to thus communicate information that is more complex than information that can be communicated through a single burst disc or multiple burst disc having the same rupturing pressure. For example, a first burst disc can be designed to rupture at a pressure $P_1$. A second burst disc can be designed to rupture at a pressure $P_2$, where $P_2$ is greater than $P_1$. Initially, both burst discs are open. After the triggering event, the first burst disc is closed. Once the first burst disc ruptures, an activation signal is sent to the second burst disc, which closes and then ruptures at the higher pressure $P_2$. At the surface, two pressure pulses will be detected with different pressure levels. In this way, more complex data can be transmitted to the surface.

In accordance with the above discussion, some embodiments provide for a method of signaling the detection of a fluid change in a wellbore operation comprising the steps of:
  introducing a first fluid into a wellbore under pressure so that there is a flow of the first fluid in the wellbore;
  introducing a second fluid into a wellbore under pressure after the first fluid has been introduced so that there is a flow of the second fluid in the wellbore at a first pressure;
  detecting at least one property that is different between the first fluid and the second fluid at a point located in the wellbore such that a change in the property is detected when second fluid flows past the point after first fluid has flowed past the point;

activating a burst disc, which can be located adjacent to the point, when the change in the property is detected, wherein the burst disc stops the flow of the second fluid until a second pressure is reached, which is higher than the first pressure;

increasing the pressure on one side of the burst disc until the second pressure is reached, wherein the burst disc is ruptured at the second pressure so as to create a pressure pulse in at least one of the first fluid and the second fluid; and detecting the pressure pulse uphole from the burst disc.

In some embodiments, the wellbore has a wellbore wall and an annulus is defined between the wellbore wall and a casing in the wellbore. The step of introducing the first fluid comprises introducing the first fluid into the annulus. The step of introducing the second fluid comprises introducing the second fluid into the annulus under the first pressure such that the second fluid pushes the first fluid downhole in the annulus so that the first fluid reaches a downhole end of the casing. In such embodiments, the method can further comprise introducing the first fluid into a central bore of the casing so that it flows uphole in the casing under pressure from the second fluid. The burst disc can be located within the central bore and, when activated, the burst disc stops the flow uphole in the casing until the second pressure is reached.

Generally, transmitting the pressure pulse can be done though at least one of a fluid column within the central bore or the casing to a pipe's uphole end. In some cases, the pressure pulse can be transmitted through the fluid column and detected at the pipe's uphole end to produce a first signal, and the pressure pulse can be transmitted through the casing and detected at the pipe's uphole end to produce a second signal. The first signal and the second signal are correlated so as to determine if the burst disc has ruptured.

The second fluid can be a cement composition and the step of detecting can be performed such that the burst disc is activated when the cement composition enters the central bore through the downhole end of the casing. In such cases, the method can comprise mixing the components of the cement composition using mixing equipment.

In other embodiments, the second fluid can be a spacer fluid and the method can further comprise introducing a cement composition into the annulus under pressure after the second fluid has been introduced so that there is a flow of cement composition in the annulus.

In the above embodiments, there can be a plurality of burst discs in series. Each burst disc can have an associated sensor with each sensor being the point at which the property is detected such that a series of pressure pulses is created by activating and rupturing of one burst disc after another. In some embodiments, at least one of the burst disc is configured to rupture at a third pressure higher than said second pressure Alternatively, each burst disc can be configured to rupture at a different pressure. In other embodiments, at least one burst disc is activated based on a different property and/or a different change in the property than the other burst discs.

Additionally, in the above embodiments, the property can be selected from the group consisting of pH, temperature, electrical conductivity, electrical resistivity, dielectric constant, magnetic permeability, radioactivity, density, viscosity, optical properties, a chemical reaction or a tracer based trigger. In some circumstances, the group will consist of a sub-combination of the aforementioned properties. Further, the first fluid and the second fluid can be introduced into the wellbore using one or more pumps.

Other embodiments provide for a system for signaling the detection of a fluid change in a reverse cementing operation. The system comprises a burst disc, a sensor and a receiver. The burst disc can be located in a central bore of a casing in a wellbore. The burst disc can have a first position allowing fluid flow through the central bore and a second position preventing fluid flow through the central bore. When the burst disc is in the second position, the burst disc ruptures due to pressure from a fluid downhole from the burst disc when the pressure reaches a predetermined pressure. The rupturing creates a pressure pulse.

The sensor is associated with the burst disc. The sensor detects at least one property that is different between a first fluid and a cement, wherein the cement is introduced into an annulus formed between the casing and wellbore and flows downhole thereby displacing the first fluid to flow uphole through the central bore. The sensor detects a change in the property when the cement flows past the sensor.

The receiver is located at a pipe's uphole end and is configured to detect the pressure pulse. The receiver can detect the pressure pulse transmitted through a fluid column within the central bore. Alternatively or additionally, the receiver can detect the pressure pulse transmitted through the casing.

In some embodiments, the system utilizes a plurality of burst discs in a series and a plurality of sensors. Each burst disc has one of the sensors associated with it such that a series of pressure pulses is created by activating and rupturing of one burst disc after another. In some cases, at least one burst disc is configured to rupture at a different predetermined pressure. In other cases, each burst disc is configured to rupture at a different predetermined pressure. In some embodiments, the sensor associated with at least one burst disc is configured to detect a different property than the sensors associated with the other burst disc. Alternatively or in addition, the sensors can detect a predetermined level of the property and at least one of the levels can detect a different predetermined level.

Although the invention has been described with reference to a specific embodiment, the foregoing description is not intended to be construed in a limiting sense. Various modifications as well as alternative applications will be suggested to persons skilled in the art by the foregoing specification and illustrations. The intention is that the appended claims will cover any such modifications, applications or embodiments as followed in the true scope of this invention.

What is claimed is:

1. A method of signaling the detection of a fluid change in a wellbore operation comprising:

introducing a first fluid into a wellbore under pressure so that there is a flow of the first fluid in the wellbore;

introducing a second fluid into a wellbore under pressure after the first fluid has been introduced so that there is a flow of the second fluid in the wellbore at a first pressure;

detecting at least one property that is different between the first fluid and the second fluid at a point located in the wellbore such that a change in the property is detected when second fluid flows past the point after first fluid has flowed past the point;

activating a burst disc when the change in the property is detected, wherein the burst disc stops the flow of the second fluid until a second pressure is reached, which is higher than the first pressure;

increasing the pressure on one side of the burst disc until the second pressure is reached, wherein the burst disc is ruptured at the second pressure so as to create a pressure pulse in at least one of the first fluid and the second fluid; and detecting the pressure pulse uphole from the burst disc.

2. The method of claim 1, wherein there is a plurality of burst discs in a series, wherein each burst disc has an associated sensor with each sensor being the point at which the property is detected such that a series of pressure pulses is created by activating and rupturing of one burst disc after another.

3. The method of claim 2, wherein at least one of the burst disc is configured to rupture at a third pressure higher than said second pressure.

4. The method of claim 1, wherein the property is selected from the group consisting of pH, temperature, electrical conductivity, electrical resistivity, dielectric constant, magnetic permeability, radioactivity, density, viscosity, optical properties, a chemical reaction or a tracer based trigger.

5. The method of claim 1, wherein:
the wellbore has a wellbore wall and an annulus is defined between the wellbore wall and a casing in the wellbore;
the step of introducing the first fluid comprises introducing the first fluid into the annulus; and
the step of introducing the second fluid comprises introducing the second fluid into the annulus under the first pressure such that the second fluid pushes the first fluid downhole in the annulus so that the first fluid reaches a downhole end of the casing: and the method further comprises:
introducing the first fluid into a central bore of the casing so that it flows uphole in the casing under pressure from the second fluid.

6. The method of claim 5, wherein the burst disc is located within the central bore and, when activated, the burst disc stops the flow uphole in the casing until the second pressure is reached.

7. The method of claim 6, further comprising:
transmitting the pressure pulse though at least one of a fluid column within the central bore or the casing to a pipe's uphole end.

8. The method of claim 7, wherein the pressure pulse is transmitted through the fluid column and detected at the pipe's uphole end to produce a first signal, the pressure pulse is transmitted through the casing and detected at the pipe's uphole end to produce a second signal, and the first signal and the second signal are correlated so as to determine if the burst disc has ruptured.

9. The method of claim 7, wherein the second fluid is a cement composition and the step of detecting is performed such that the burst disc is activated when the cement composition enters the central bore through the downhole end of the casing.

10. The method of claim 9, further comprising mixing the components of the cement composition using mixing equipment.

11. The method of claim 7, wherein the second fluid is a spacer fluid and wherein the method further comprises:

introducing a cement composition into the annulus under pressure after the second fluid has been introduced so that there is a flow of cement composition in the annulus.

12. The method of claim 7, wherein property is selected from the group consisting of pH, temperature, electrical conductivity, electrical resistivity, dielectric constant, magnetic permeability, radioactivity, density, viscosity, optical properties, a chemical reaction or a tracer based trigger.

13. The method of claim 7, wherein there is a plurality of burst discs in series, wherein each burst disc has an associated sensor with each sensor being the point at which the property is detected such that a series of pressure pulses is created by activating and rupturing of one burst disc after another.

14. The method of claim 13, wherein each burst disc is configured to rupture at a different pressure.

15. The method of claim 7, wherein the first fluid and the second fluid are introduced into the wellbore using one or more pumps.

16. A system for signaling the detection of a fluid change in a reverse cementing operation, the system comprising:
a plurality of burst discs located in a series in a central bore of a casing in a wellbore, each burst disc of the plurality of burst discs having a first position allowing fluid flow through the central bore and a second position preventing fluid flow through the central bore; wherein, when the burst disc is in the second position, the burst disc ruptures due to pressure from a fluid downhole from the burst disc when the pressure reaches a predetermined pressure and the rupturing creates a pressure pulse such that a series of pressure pulses is created by activating and rupturing one burst disc after another;
a plurality of sensors associated with the plurality of burst discs, such that each burst disc has one sensor of the plurality of sensors associated with the burst disc, and wherein the sensor that detects at least one property that is different between a first fluid and a cement, wherein the cement is introduced into an annulus formed between the casing and wellbore and flows downhole thereby displacing the first fluid to flow uphole through the central bore, and wherein the sensor detects a change in the property when the cement flows past the sensor;
a receiver located at a pipe's uphole end and configured to detect the pressure pulse.

17. The system of claim 16, wherein the receiver detects the pressure pulse transmitted through a fluid column within the central bore.

18. The system of claim 17, wherein the receiver detects the pressure pulse transmitted through the fluid column and as it is transmitted through the casing.

19. The system of claim 16, wherein each burst disc is configured to rupture at a different predetermined pressure.

* * * * *